Patented June 10, 1952

2,599,683

UNITED STATES PATENT OFFICE 2,599,683

GREASE COMPOSITION

Stanley T. Abrams and Fred H. Stross, Berkeley, Calif., assignors to Shell Development Company, San Francisco, Calif., a corporation of Delaware No Drawing. Application May 3, 1949, Serial No. 91,229

11 Claims. (Cl. 252—25)

This invention is concerned with improvements in grease compositions. More particularly, it is directed to greases containing inorganic gelling agents such as alumina gel.

Greases have been prepared by the use of inorganic gels such as silica gel, alumina gel and the like for use where high temperature conditions exist or where other deteriorating factors are present. While greases containing inorganic gelling agents possess certain properties making them especially useful for high temperature purposes, they inherently are sensitive to the action of water or water vapor. It has been noted that when a grease comprising a lubricating oil gelled with alumina is used as the lubricant in steel rolling mill bearings, separation takes place between the lubricating oil and the alumina gel. This appears to be due to the presence of large amounts of water employed in steel rolling mills since these greases have been found to be sensitive to the presence of water under other operating conditions as well. In serious cases of water sensitivity greases gelled with inorganic oxides or hydroxides have been found to separate into two phases when contacted with cold water or with hot water or steam. The adverse effect of water action is noted by a disintegration of the grease structure which results in a liquefying of the grease, the lubricating oil medium tending to flow away from the gel and the inorganic gelling agent separating from the grease in the form of a granular or crystalline precipitate. It has been found in the case of silica gels and the like that greases made therefrom may be stabilized against the deleterious action of water by the presence of high molecular weight soaps or amines.

It is an object of the present invention to improve the water resistance of greases gelled by the presence of amphoteric metal inorganic compounds. It is a further object of the present invention to improve the water resistance of alumina gelled greases. Other objects will become apparent during the following discussion.

Now, in accordance with this invention, it has been found that the resistance to disintegration by water action of an oleaginous composition gelled or thickened by the presence of an inorganic amphoteric metal gel may be substantially improved by the addition of a minor amount based on the gel of lipophilic high molecular weight acids of certain classes as defined more particularly hereinafter.

The term "inorganic amphoteric metal gel" is meant to include especially the gels of such metals as aluminum which exhibit both basic and acidic properties. Alumina is known to have this dual function. Other oxides and hydroxides which fall within this class are lead oxide, zinc oxide, zinc hydroxide, tin oxide, tin hydroxide, tellurium oxide, zirconium oxide, titanium oxide, chromium hydroxide, and others having similar properties. Authorities such as Mellor define this class of compounds as being "amphoteric oxides" or "intermediate oxides."

The classes of acids which have been found to improve the water resistance of greases prepared from the above gels of amphoteric metal compounds are those having at least 10 carbon atoms and especially belonging to the classes of phosphinic acids, phosphonic acids, fatty acids, aliphatic dicarboxylic acids, amino fatty acids, sulfonic acids, naphthenic acids, and the chlorinated, sulfurized and phosphorized derivatives of the same.

The lubricating oils or oleaginous materials from which the subject greases may be prepared include especially mineral lubricating oils and other natural oils such as vegetable and fish oils as well as synthetic lubricants such as the silicones, polymerized olefins, alkylene polymers, alkylene glycol polymers; esters of dicarboxylic acids such as bis(2-ethylhexyl)sebacate and phosphates such as tricresyl phosphate and trioctyl phosphate. While these varieties of lubricants are suitable for the present purpose, the invention does not reside in the use of a specific type of lubricating medium. Hence, any of the well-known lubricants may be employed in the preparation of the present compositions either by themselves or in admixture with any of the lubricants enumerated above.

While the present invention is mainly described in respect to greases, it will be understood that it applies to compositions (such as oil-base drilling fluids) employing thinner oily materials such as kerosene, gas oil, fuel oil and corresponding shale oil fractions.

The greases prepared according to the present invention preferably contain a major proportion of the lubricating medium gelled by the presence of from about 5% to about 40% by weight of the grease of the amphoteric metal compound gelling agent. These greases are water-proofed by the presence of about 2% to about 20% by weight of the gel of the acids selected from those enumerated above. Greases having sufficient consistency for ordinary purposes contain from about 5% to about 20% by weight of the grease of the amphoteric metal compound gel and sufficient water-proofing action is usually obtained by the use of 5% to 15% of the lipophilic acids based on the weight of the gel. The gels which are useful for the preparation of greases are those having a gel structure substantially that originally formed, i. e. one which is substantially unshrunken. It has been found that shrinkage of the gel structure such as occurs in the preparation of ordinary gels precludes the possibility of grease formation. It has been necessary in some instances to resort to aerogel formation, although it is a desirable feature to avoid this process if it is possible to do so. However, the types of unshrunken gels such as are obtained in the aerogel process are the variety especially desirable for the preparation of greases. Any method substituted for the aerogel process should result in the preparation of gels having a substantially unshrunken gel structure.

Aerogels may be prepared by methods well-known in the art. In general, these comprise the formation in aqueous media of a hydroxide or oxide such as alumina. By-product salts such as sodium chloride and the like should be removed by washing or other means since the presence of any appreciable amount of salt in the final composition may prevent the formation of a suitable grease structure. After the removal of inorganic salts, the hydrous gel is dehydrated by replacement of the water with an anhydrous solvent such as acetone or methyl alcohol. The alcoholic gel is then heated under pressure to a temperature above the critical temperature of the solvent present. When this point is reached, the solvent is allowed to escape leaving behind a gel structure which is substantially that originally formed or which has been shrunken only to an insignificant extent.

Since aerogel formation necessitates careful control and the use of expensive equipment, other means for the preparation of unshrunken gels are preferred. One process which permits the formation of suitable gels comprises formation of a hydrous oxide or hydroxide gel of the amphoteric metal, replacement of the water with an oil-soluble solvent such as ethyl alcohol, admixture of the alcoholic gel with a lubricating oil and subsequent distillation for the removal of the volatile organic solvent. A point is reached during the removal of the solvent when the inorganic gel becomes coated with oil to a sufficient extent that a grease composition results. It will be noted that while aerogel formation has been avoided, the gel at no point has been permitted to dehydrate under conditions which encourage shrinkage of the gel structure.

An alternative procedure comprises mixing a hydrous gel and alcohol with oil, using azeotropic distillation to remove water and then distilling any remaining alcohol.

Another process for the preparation of suitable gels comprises contacting alcoholic solutions of aluminum chloride and sodium hydroxide to form an alcoholic suspension of aluminum hydroxide followed by washing with methanol to remove sodium chloride and form a salt-free alcoholic suspension of the alumina. The suspension may then be mixed with a lubricating oil and subjected to distillation as described above for the formation of a grease.

Incorporation of the acidic components of the grease for the purpose of water-proofing may be effected prior to, during or following actual grease formation. For example, the acids are readily dispersed or dissolved in the lubricating oil medium, following which the amphoteric metal gel may be added for the formation of the grease. For some reason as yet undetermined, the water-proofing action of a given acid appears to be greater if it is added to the grease subsequent to grease formation. Therefore, this latter alternative is preferred. Another means of improving the water-proofing action of the greases comprises heating the completely formulated grease for a period of 10 minutes to six hours at a temperature from about 110° C. to about 150° C.

Suitable acids for use in the present compositions include especially the higher fatty acids which may be either saturated or unsaturated such as stearic acid, oleic acid, or linoleic acid. While the fatty acid should contain a lipophilic hydrocarbon radical having at least 10 carbon atoms, those having at least 14 carbon atoms are preferred. The phosphonic and phosphinic acids suitable in the present compositions include mono-hydrocarbon phosphinic acids, di-hydrocarbon phosphinic acids and the hydrocarbon phosphonic acids. Preferably each of these classes of phosphorous-containing acids bears a lipophilic hydrocarbon radical having from 10 to 24 carbon atoms. This radical may be a saturated or unsaturated aliphatic radical or may be cycloalkyl, aryl, alkaryl or aralkyl. Typical and suitable species of these groups include tetradecane-1-phosphinic acid, 3,5-diisobutyl benzene phosphinic acid, methylhexadecane-1-phosphinic acid, dodecane-1-phosphonic acid, 10-phenyldecane-1-phosphonic acid, and 2,4-diamylcyclohexane phosphonic acid. Dicarboxylic acids such as alkylated succinic acid also are suitable, including both alkyl and alkenyl succinic acid. A particularly useful member of this series is octadecenyl succinic acid. Amino acids have been found to be especially useful since they contain two functional groups found to have water-proofing action in the present compositions. The amino fatty acids, such as, for example, 12-aminostearic acid, are particularly effective. Sulfonic acids containing lipophilic hydrocarbon groups also may be employed. The preferred species of these include especially the mahogany and the green acids which are formed in the treatment of lubricating oil with concentrated sulfuric acids and other commercial sulfonic acids such as Turkey red oil. Special products of this class which may be employed are the sulfonated polyalkyl naphthalenes such as polyamyl naphthalene sulfonic acid. Naphthenic acids also are suitable and comprise especially the naphthenic acids derived from petroleum sources. The chlorination, sulfurization or phosphorization of any of the above types of acids does not appear to materially affect their water-proofing actions in the grease compositions but simultaneously imparts thereto the extreme pressure property characteristic of these materials which have been described elsewhere.

The proportion of acid present in the grease compositions should always be restricted to an amount sufficient to maintain the structure of the grease under adverse water conditions but not so great as to unduly soften the grease or to destroy the gelling properties of the inorganic components. It has been found that if the amount of the acid exceeds about 20% by weight of the gel, the grease which results is softer than usable in many applications. While the primary reason for this critical limitation is not apparent, it possibly is due to a reduction in the surface attraction occurring between the gel particles which is responsible for the formation of the grease structure.

The greases made in accordance with the present invention may include other well-known ingredients such as anti-oxidants and extreme pressure agents. Thickeners such as polymers of methacrylic acid esters as well as polymers of olefins and diolefins are suitable for improving the low temperature properties of the grease.

In testing compositions for their resistance to the action of water, an unmodified grease comprising a mineral lubricating oil containing 5% aluminum hydroxide was employed. It was found that this grease disintegrated when contacted with warm water. Incorporation of 1% by weight of the grease of stearic acid resulted in the formation of a grease which did not disintegrate with either cold or boiling water. Other acids tested as above and found to be successful water-proofing agents were 1-tetradecane phosphinic acid, N-hexadecane phosphinic acid, tetradecane phosphonic acid and petroleum naphthenic acids.

While the above disclosures refer in most instances to greases, the invention embraces more fluid compositions, such as oil-base drilling fluids and the like, wherein relatively thin oleaginous materials are thickened by the water-proof gels, or ordinary lubricants are thickened but not gelled by the presence of amounts of the water-proofed gels in an amount to substantially thicken the composition but not necessarily to set it to a rigid grease-like structure. Thus, by using from 1% to 5% by weight of the composition of the described gels in an oleaginous fluid, thixotropic compositions are formed which may be utilized where greases are not required.

We claim as our invention:

1. A grease composition comprising a major proportion of a lubricating oil, 5 to 40% by weight of said composition of a substantially anhydrous alumina gel and 2 to 20% by weight of said gel of stearic acid, said gel retaining in the composition the gel structure substantially as originally formed.

2. A grease composition comprising a major proportion of a lubricating oil, 5 to 40% by weight of said composition of a substantially anhydrous alumina gel and 2 to 20% by weight of said gel of n-octadecane-1-phosphonic acid, said gel retaining in the composition the gel structure substantially as originally formed.

3. A grease composition comprising a major proportion of a lubricating oil, 5 to 40% by weight of said composition of a substantially anhydrous zinc hydroxide gel and 2 to 20% by weight of the gel of a petroleum hydrocarbon sulfonic acid, said gel retaining in the composition the gel structure substantially as originally formed.

4. A grease composition comprising a major proportion of a lubricating oil, 5 to 40% by weight of said composition of a substantially anhydrous alumina gel and 2 to 20% by weight of said gel of a fatty acid having at least 10 carbon atoms, said gel retaining in the composition the gel structure substantially as originally formed.

5. A grease composition comprising a major proportion of a lubricating oil, 5 to 40% by weight of said composition of a substantially anhydrous alumina gel and 2 to 20% by weight of said gel of a phosphonic acid having at least one lipophilic hydrocarbon radical, said gel retaining in the composition the gel structure substantially as originally formed.

6. A grease composition comprising a major proportion of a lubricating oil, 5 to 40% by weight of said composition of a substantially anhydrous zinc hydroxide gel and 2 to 20% by weight of the gel of a sulfonic acid bearing a lipophilic hydrocarbon radical, said gel retaining in the composition the gel structure substantially as orignally formed.

7. A grease composition comprising a lubricating oil, 5 to 40% by weight of said composition of a substantially anhydrous inorganic gel of an amphoteric metal, said gel retaining in the composition the gel structure substantially as originally formed, and 2 to 20% by weight of said gel of a lipophilic acid containing at least one hydrocarbon radical having at least 10 carbon atoms and being selected from the group consisting of phosphinic acids, phosphonic acids, fatty acids, aliphatic dicarboxylic acids, amino fatty acids, sulfonic acids, and naphthenic acids.

8. An oleaginous composition comprising a major amount of an oleaginous fluid, 1 to 40% by weight of said composition of a substantially anhydrous inorganic gel of an amphoteric metal, said gel retaining in the composition the gel structure substantially as originally formed, and 2 to 20% by weight of said gel of a lipophilic acid containing at least one hydrocarbon radical having at least 10 carbon atoms and being selected from the group consisting of phosphinic acids, phosphonic acids, fatty acids, aliphatic dicarboxylic acids, amino fatty acids, sulfonic acids, and naphthenic acids.

9. A grease composition comprising a petroleum lubricating oil, 5 to 40% by weight of said composition of a substantially anhydrous inorganic gel of an amphoteric metal, said gel retaining in the composition the gel structure substantially as originally formed, and 2 to 20% by weight of said gel of a lipophilic acid containing at least one hydrocarbon radical having at least 10 carbon atoms and being selected from the group consisting of phosphinic acids, phosphonic acids, fatty acids, aliphatic dicarboxylic acids, amino fatty acids, sulfonic acids, and naphthenic acids.

10. A grease composition comprising a petroleum lubricating oil, 5 to 40% by weight of said composition of a substantially anhydrous inorganic gel of an oxide of an amphoteric metal, said gel retaining in the composition the gel structure substantially as originally formed, and 2 to 20% by weight of said gel of a lipophilic acid containing at least one hydrocarbon radical having at least 10 carbon atoms and being selected from the group consisting of phosphinic acids, phosphonic acids, fatty acids, aliphatic dicarboxylic acids, amino fatty acids, sulfonic acids, and naphthenic acids.

11. A grease composition comprising a petroleum lubricating oil, 5 to 40% by weight of said composition of a substantially anhydrous inorganic gel of a hydroxide of an amphoteric metal, said gel retaining in the composition the gel structure substantially or originally formed, and 2 to 20% by weight of said gel of a lipophilic acid containing at least one hydrocarbon radical having at least 10 carbon atoms and being selected from the group consisting of phosphinic acids, phosphonic acids, fatty acids, aliphatic dicarboxylic acids, amino fatty acids, sulfonic acids, and naphthenic acids.

STANLEY T. ABRAMS.
FRED H. STROSS.

REFERENCES CITED

The following references are of record in the file of this patent:

UNITED STATES PATENTS

| Number | Name | Date |
|---|---|---|
| 2,260,625 | Kistler | Oct. 28, 1941 |
| 2,382,694 | Darley | Aug. 14, 1945 |